J. PRICE.
Sulky-Plow.

No. 211,425.  Patented Jan. 14, 1879.

Witnesses:
Edward P. Palmer
William S. DuBois

Inventor:
Jacob Price

UNITED STATES PATENT OFFICE.

JACOB PRICE, OF SAN LEANDRO, CALIFORNIA.

IMPROVEMENT IN SULKY-PLOWS.

Specification forming part of Letters Patent No. 211,425, dated January 14, 1879; application filed September 12, 1878.

*To all whom it may concern:*

Be it known that I, JACOB PRICE, of San Leandro, county of Alameda, State of California, have invented a new and useful Improvement in Gang and Sulky Plows and Cultivators, of which the following is a specification:

My invention relates to that class of plows and cultivators whose frames are carried on wheels, said wheels being connected therewith by a double-crank axle—that is to say, an axle having a crank on each end—to which the carrying-wheels of the implement are attached.

The object of my invention is to provide an improved means whereby both of the carrying-wheels of a gang-plow, sulky-plow, or cultivator may be depressed with reference to the frame thereof by the power of the animals attached thereto, and whereby the same movement that lowers both wheels shall also lower the land-wheel with reference to the furrow-wheel, thus preserving the frame of the plow or plows or cultivator in a nearly level position, both when the plows are in the ground and when they are out of it, and allowing the plow or plows to work properly when rigidly attached to the frame.

My invention consists mainly in the employment of a geared lifting device operated by horse-power in connection with a double-crank axle—operating both of the carrying-wheels—attached to a gang-plow, sulky-plow, or cultivator, and the use of a corrugated brake for holding one of the gear-wheels of the lifting device when desired.

Figure 1:
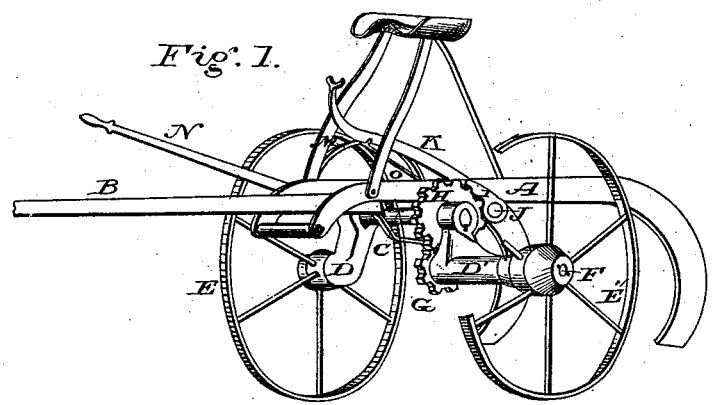
Figure 2:
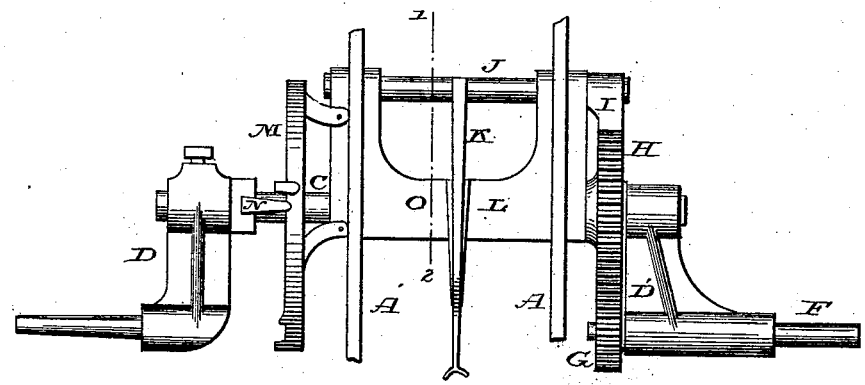
Figure 3:
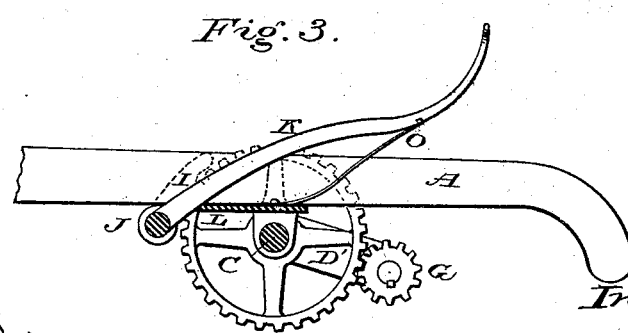

In the accompanying drawing, in which similar letters of reference refer to the same parts in each of the figures, Figure 1 is a perspective view of a gang-plow (without the plows) embodying my invention. Fig. 2 is a plan of a double-crank axle and a portion of the frame of a gang-plow with the devices that I have invented attached thereto. Fig. 3 is a longitudinal section of a portion of a gang-plow frame through the line 1 2, Fig. 2.

A A' are the beams of a gang-plow, to which the plows are firmly bolted. B is the tongue. C is the straight portion of a double-crank axle attached to and carrying the beams A A', and D D' are the cranks. E E' are the carrying-wheels, one of which, E, runs on a spindle on the lower end of the crank D, while the other, E', is keyed on one end of the shaft F, which revolves in a box on the outer end of the crank D'. On the other end of the shaft F is keyed a spur-pinion, G, whose teeth engage with those of the spur-wheel H, which turns freely on the axle C, except when held by the brake I.

The brake I is keyed to a shaft, J, to which is attached the foot-lever K. There are corrugations on the face of the brake I that are of such a size that the teeth of the spur-wheel H fit into the depressions thereof in such a manner as to cause a slight pressure on the foot-lever K to hold the said wheel H from revolving while the cranks D D' are being depressed, and yet which will, from their peculiar form, allow the wheel H to revolve if a strain greater than that necessary to depress the cranks is put upon it. The axle C and the shaft J are both attached to the metal plate L by suitable boxes, the metal plate being attached to the frame by clips.

The ratchet-segment M and the hand-lever N, Fig. 1, are of the usual kind, and may be varied in construction to suit the requirements of different implements. I prefer to construct the ratchet-segment with a movable stop, which will allow the lever N to go back only till the wheels are raised a sufficient distance to allow the plows to run at a proper depth, but which will permit it to go forward freely at any time till it arrives at the lower part of the ratchet-segment M, where there is a notch to catch it and hold it until released by the operator.

The foot-lever K is held in such a position by the spring O that the brake I is not allowed to touch the spur-wheel H except when pressure is put upon said foot-lever K by the driver.

The operation of depressing the wheels, thereby raising the plows, is as follows: Pressure being put upon the foot-lever K, the corrugated face of the brake I is applied to the spur-wheel H, preventing it from turning. This compels the pinion G, driven by the carrying-wheel E', to travel downward around the spur-wheel H, carrying the cranks D and D' with it. The effect of this movement is to carry the cranks D and D' downward from a nearly horizontal position to one nearly vertical, the result of which is to raise the plows from the ground, at the same time bringing the carrying-wheels E E' to a point nearly the same distance below the frame, although the land-wheel E', when the cranks were nearly horizontal and the plows were in the ground, may have been several inches higher than the furrow-wheel E. When the cranks have been depressed as much as is desirable, the lever N catches automatically in the lowest notch in the ratchet-segment M, holding them till released by the operator. To raise the wheels and allow the plows to enter the ground, it is only necessary to release the lever N with the foot and allow the cranks to resume their former position.

It will be seen that by the use of this lifting device, in connection with an axle having a crank on each end, to which the carrying-wheels are attached, I am enabled to construct a gang-plow, sulky-plow, or cultivator that the operator can raise or lower by the foot alone, and which shall always have its frame nearly parallel with the surface of the ground, whether the plows be in or out of the earth.

Having thus described my invention, what I claim, and desire to secure by Letters Patent, is—

1. In a sulky-plow, the combination of the axle C, having the fixed crank D and the loose spur-wheel H, with the loose journal-crank D', the spindle-shaft F, pinion G, and brake I, as and for the purpose specified.

2. In a sulky-plow, the combination of the rigid plow-frame A A' L, the double-crank axle, the pinion G, spur-wheel H, brake I, and levers K N, substantially as shown and described.

3. The combination of the double-crank axle, the gear-wheels G H, corrugated brake I J, foot-lever K, locking-lever N, and segment M, with adjustable stop, substantially as shown and described.

JACOB PRICE.

Witnesses:
EDWARD P. PALMER,
ALEXANDER ROBINSON.